Figure 1:
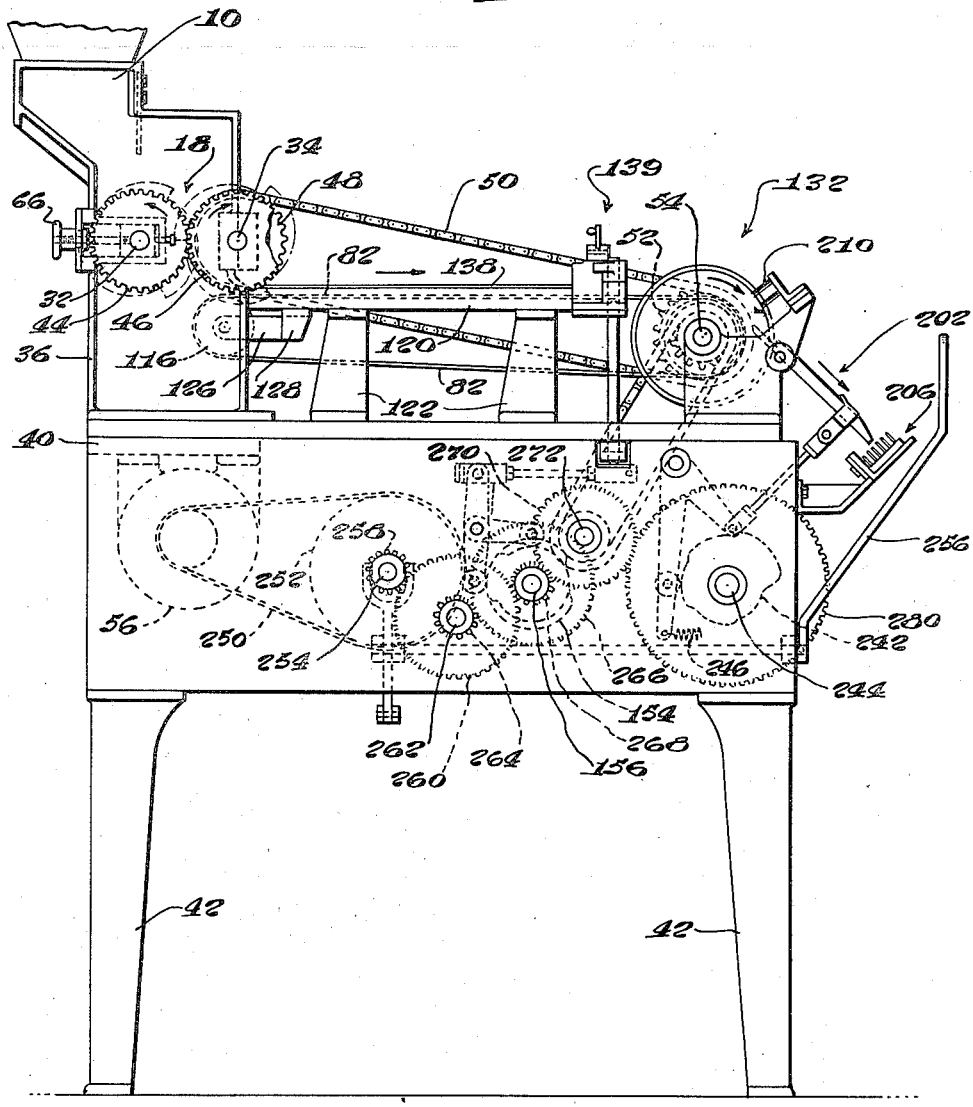

Aug. 20, 1946.　　　R. W. VERGOBBI　　　2,406,176
BULLET HANDLING APPARATUS
Filed Jan. 21, 1943　　　5 Sheets-Sheet 1

INVENTOR.
Robert William Vergobbi
BY
J. Stanley Churchill.
ATTORNEY

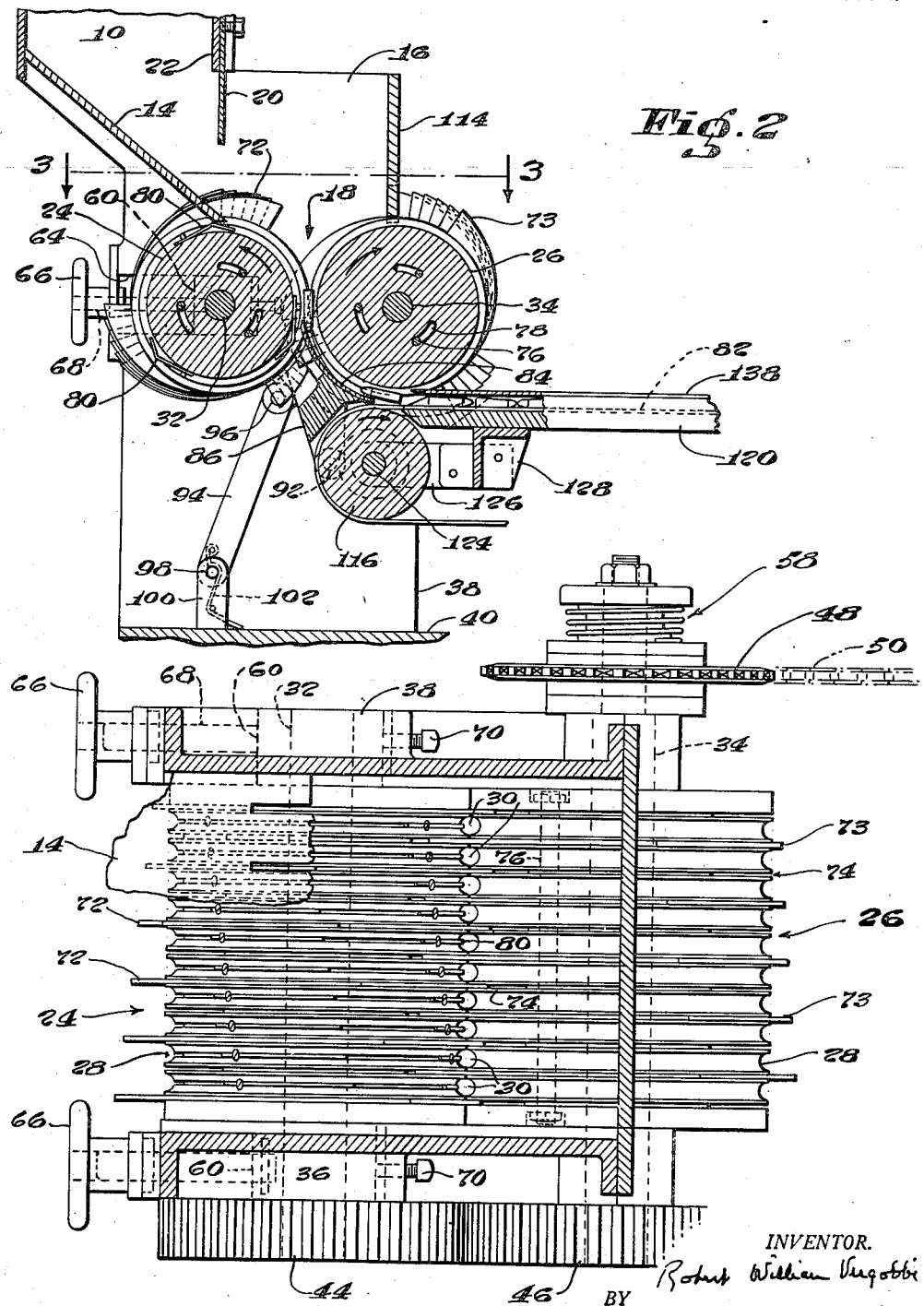

Aug. 20, 1946.  R. W. VERGOBBI  2,406,176
BULLET HANDLING APPARATUS
Filed Jan. 21, 1943   5 Sheets-Sheet 3
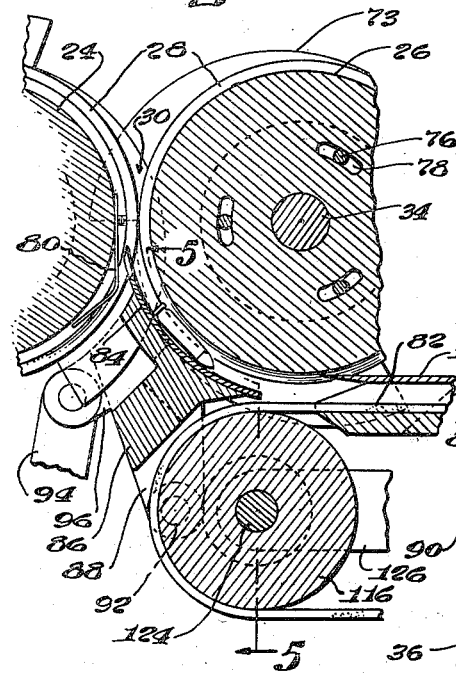
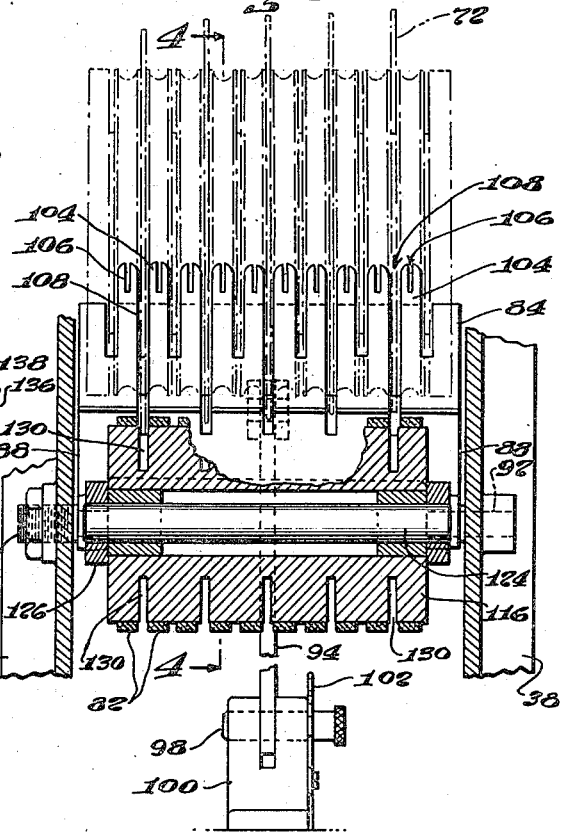
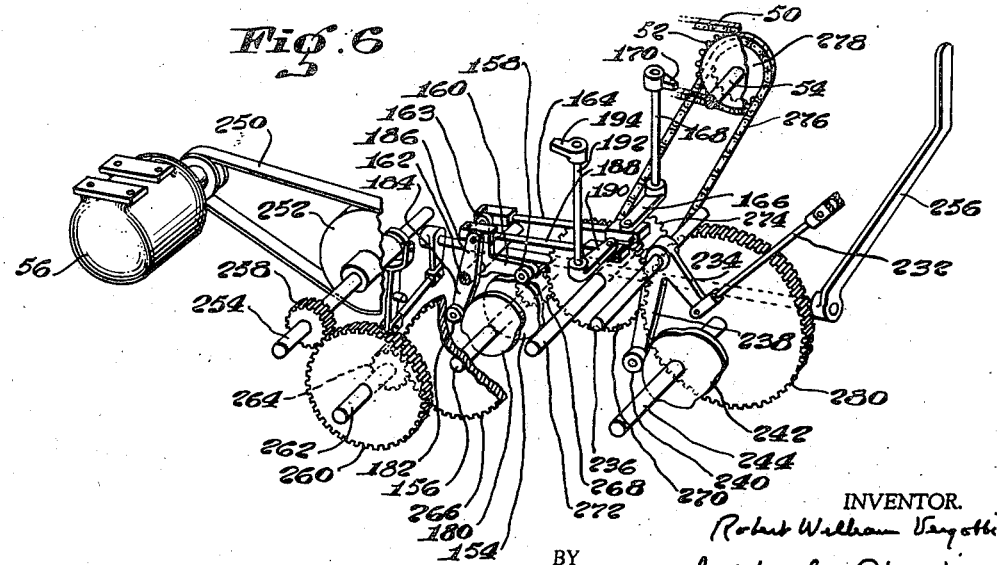
INVENTOR.
Robert William Vergobbi
BY
J. Stanley Churchill
ATTORNEY.

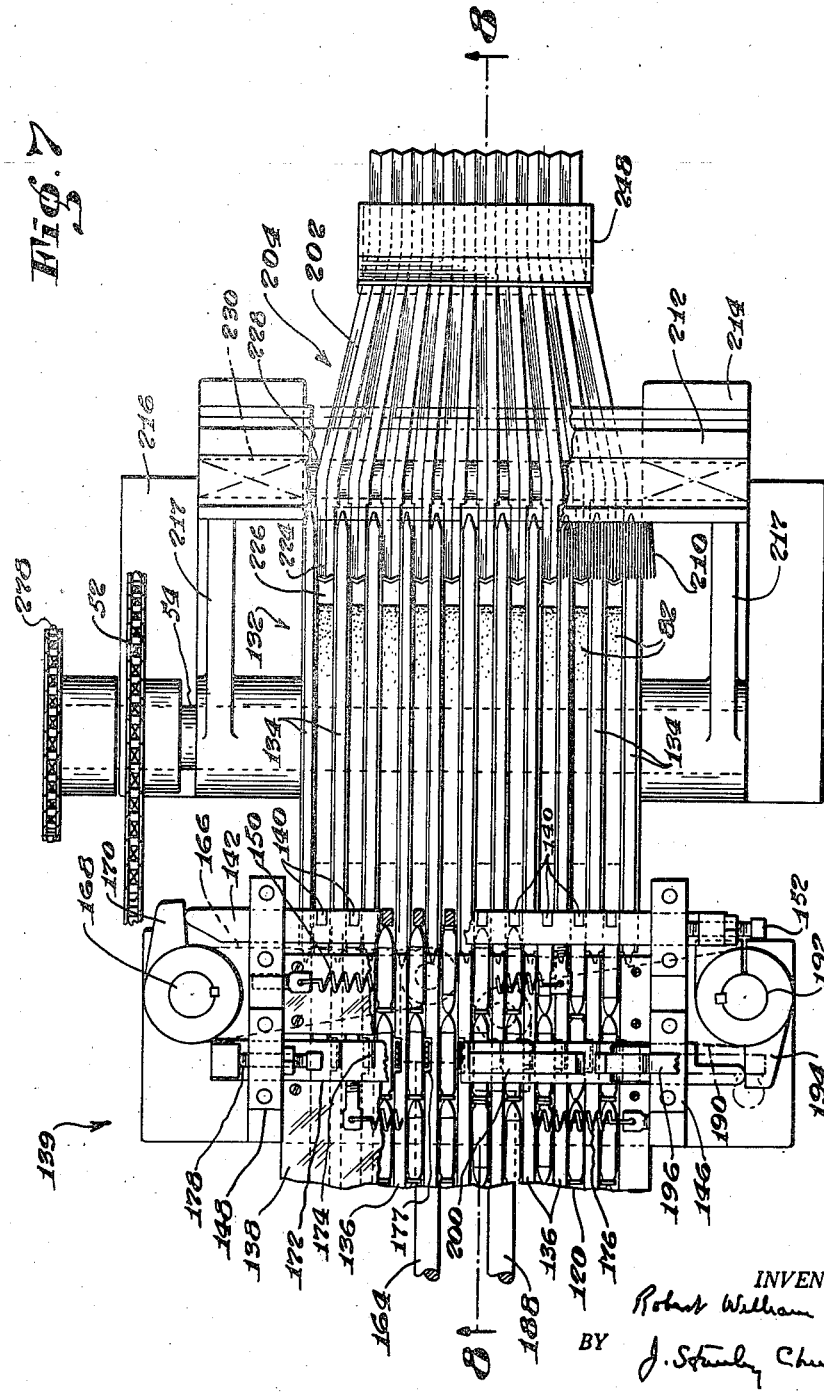

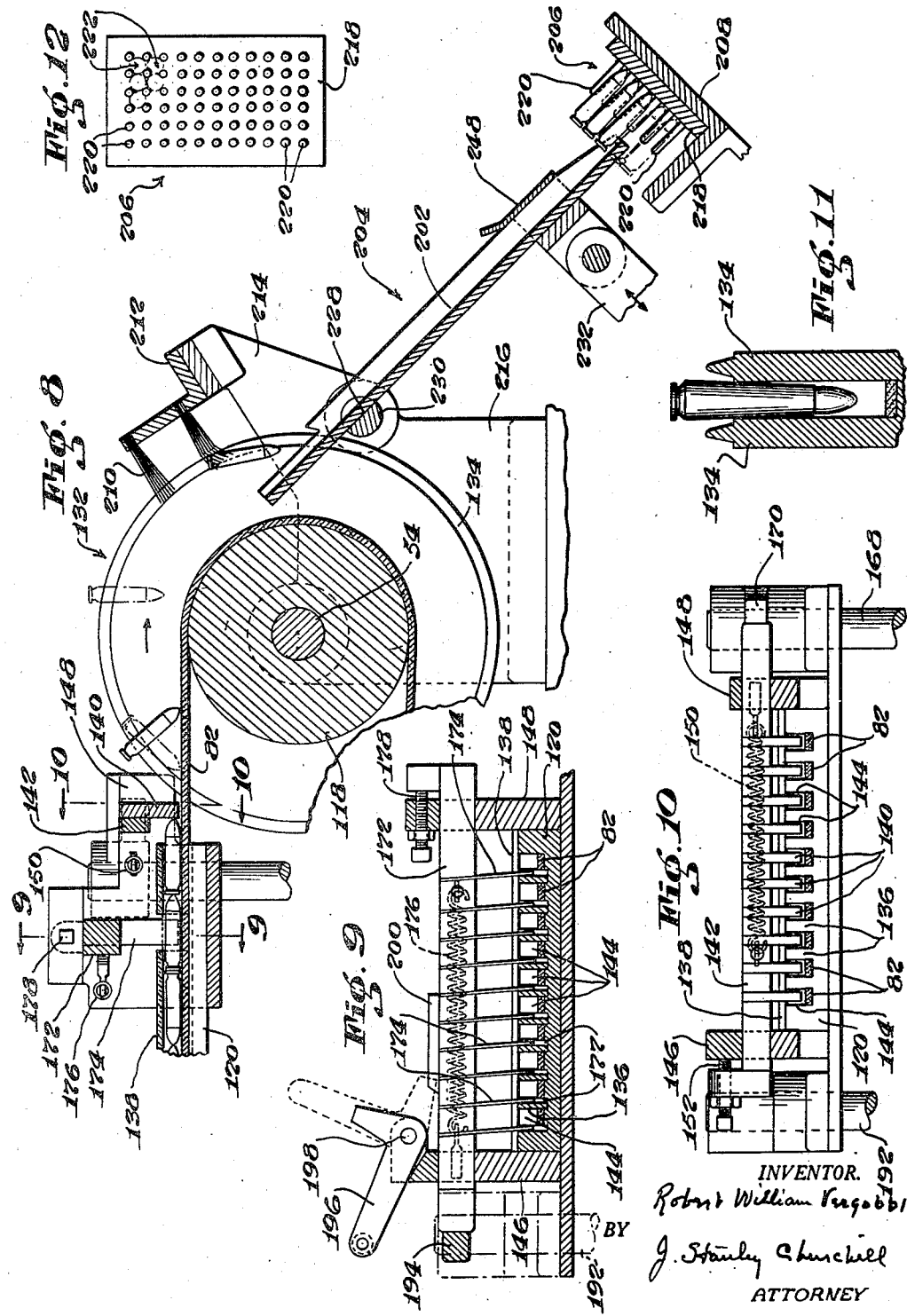

Patented Aug. 20, 1946

2,406,176

UNITED STATES PATENT OFFICE 2,406,176

BULLET HANDLING APPARATUS

Robert William Vergobbi, Quincy, Mass., assignor to Pneumatic Scale Corporation, Limited, Quincy, Mass., a corporation of Massachusetts Application January 21, 1943, Serial No. 473,092

6 Claims. (Cl. 198—33)

This invention relates to bullet handling apparatus.

The invention has for an object to provide novel and improved bullet handling apparatus which is adapted to release bullets from a bulk supply thereof, in which they are haphazardly or indiscriminately stored, and to cause the bullets to assume an orderly and uniform arrangement in a simple, positive and expeditious manner, whereby to dispose the bullets in a position such as to facilitate the packing thereof.

With this general object in view, and such others as may hereinafter appear, the invention consists in the bullet handling apparatus and in the various structures, arrangements and combinations of parts hereinafter described and particularly defined in the claims at the end of this specification.

In the drawings illustrating the preferred embodiment of the invention, Fig. 1 is a side elevation of apparatus for feeding and arranging bullets embodying the present invention; Fig. 2 is a side elevation in cross section of the bullet supply hopper and withdrawing mechanism to be referred to; Fig. 3 is an enlarged plan view, partly in cross section, as viewed from the line 3—3 of Fig. 2; Fig. 4 is an enlarged side elevation in cross section taken on the line 4—4 of Fig. 5 of a detail to be referred to; Fig. 5 is a view in cross section taken on the line 5—5 of Fig. 4; Fig. 6 is a perspective view illustrating the driving mechanism of the present apparatus; Fig. 7 is a plan view of the delivery end of the apparatus, some of the parts being broken away to more clearly illustrate the invention; Fig. 8 is a side elevation in cross section taken on the line 8—8 of Fig. 7; Figs. 9 and 10 are enlarged detail views in cross section taken on the lines 9—9 and 10—10 respectively of Fig. 8; Fig. 11 is an enlarged detail view in cross section to be referred to; and Fig. 12 is a plan view of the supporting member, shown in Fig. 8, into which the bullets are delivered as will hereinafter be more fully described.

The present invention contemplates apparatus for feeding and orienting elongated conical or tapered articles, such as bullets, which is preferably arranged to deliver the articles in a uniform arrangement to a supporting tray from which they may be conveniently and readily transferred into a carton or other container to be packed for shipment. In general, the apparatus comprises a supply hopper, in which a bulk supply of the haphazardly arranged bullets are stored, having mechanism associated therewith for withdrawing the bullets to present them end to end in a plurality of adjacent elongated rows upon conveyer belts, without discrimination as to whether the bullets point forward or backward. The bullets thus being fed are then presented to an orienting device arranged to cause the bullets to assume a position in which they all point in the same direction and provision is made for delivering the orientated bullets, by a chute, into a palet comprising a studded tray for supporting the bullets in a uniformly arranged and compact group. The bullets thus arranged may be readily and conveniently transferred into a carton or other container in which they are to be packed by merely inverting the group of bullets into the container.

Referring now to the drawings, which as above stated illustrate the preferred embodiment of the invention, 10 represents a hopper into which a bulk supply of the bullets are deposited. The hopper is provided with a sloping bottom plate 14 which serves to divert the flow of bullets into an offset portion 16, at the lower end of which is disposed the bullet feeding or releasing mechanism indicated generally at 18. An adjustable plate 20 may be attached to an intermediate wall 22 of the hopper, as shown, in order to control the flow of the bullets into the releasing mechanism. The offset portion 16 of the hopper is preferably open at the top so as to enable the operator to observe the progress of the bullets as they pass into the releasing mechanism 18 and to render the mechanism easily accessible.

The bullet feeding or releasing mechanism 18 as best shown in Figs. 2 and 3, comprises a plurality of pairs of opposed semi-spherically grooved or channeled wheels 24, 26, each pair having their peripheral edges in substantially contiguous engagement so that the semi-spherical or concave grooves 28 of each pair of wheels cooperate to form a substantially circular opening 30 at the point of tangency through which a bullet may pass in a longitudinal direction. The opposed wheels 24, 26 are mounted upon shafts 32, 34 respectively which are journaled in suitable bearings in side frames 36, 38, the latter forming the side walls of the hopper as shown. The side frames 36, 38 are mounted upon the platen 40 of the machine frame which is in turn supported upon legs 42.

Provision is made for rotating the opposed wheels 24, 26 and, as best shown in Figs. 1 and 3, the shafts 32, 34 are geared together to be simultaneously driven in opposed directions by gears 44, 46. The shaft 34 is provided at one end with a sprocket 48 which is connected by a chain 50 to a sprocket 52, see Fig. 6, fast on a drive shaft 54 which may be driven through connections from the motor 56 as will be hereinafter described. It will be observed that the sprocket 48 is loosely mounted on the shaft 34 and is arranged to drive the wheels 24, 26 through a spring-pressed friction clutch unit indicated at 58 which is capable of slipping to prevent damage to the operating parts in the event of a jam. Provision is also preferably made for adjusting the shaft 32 axially with relation to the shaft 34 in order to accurately position the opposed wheels with relation to each other and, as herein shown, the shaft 32 is journaled in slide blocks 60 capable of being adjusted in slide bearings 64 by threaded hand wheels 66 and rods 68. Stop screws 70 provided in the ends of the slide bearings serve to limit the forward movement of the slide blocks so as to present the wheels 24 in cooperative engagement with the wheels 26.

As indicated by the arrows in Fig. 2, the opposed grooved wheels 24, 26 are rotated in a direction opposite to the direction of movement of the bullets therebetween so as to tend to lift the mass of bullets upwardly and to keep them in motion until they assume a vertical position in alignment with the circular openings 30 whereupon such bullets fall through the openings by gravity. In order to assist the bullets to assume the proper position to enable them to fall through the openings 30 in a longitudinal direction, provision is made for agitating and guiding the mass of bullets during the rotation of the wheels 24, 26. As herein shown, eccentric members 72, 73 are provided between alternate wheels of each group or set of wheels 26, 26 and as best shown in Figs. 2 and 3, the eccentric members 72 mounted between alternate wheels of one set, 24, pass between spaces 74 formed between the opposing set 26. Each eccentric member 72 is provided with a plurality of high points, herein shown as three, and successive eccentric members are also preferably set back or fanned out with relation to each other around the circumference of the wheels, as clearly illustrated in Fig. 2, so that in operation, as successive high points of the eccentrics rotate upwardly through the mass of bullets, they operate to progressively agitate the mass and tend to lift those bullets which are horizontally disposed in the hopper to cause them to assume a substantially vertical position. Thus, in operation, those bullets adjacent the openings 30 which are in a substantially vertical position are free to fall by gravity through such openings to be separated from the mass of bullets in the hopper. The second group of eccentric members 73 are similarly disposed between alternate wheels of the set 26 mounted on the shaft 34 except that the members 73 are disposed between different alternate wheels to enable them to pass between the spaces formed between the opposing set of wheels 24 as clearly shown in Fig. 3. All of the wheels, and the eccentrics disposed therebetween are adjustably mounted with relation to each other, being held in assembled relation by elongated bolts 76 which pass through slotted openings 78 formed in the wheels and the eccentrics as shown in Figs. 2 and 3. With this construction it will be seen that in the operation of the machine, the eccentrics act as combs or rakes to comb through the mass of bullets and to guide them into the grooves 28 in a longitudinal position so that they may pass through the openings 30.

In order to further assist in guiding the bullets into the spherical openings 30 formed between opposed pairs of wheels, bent pieces of spring wire 80 are secured at suitable spaced intervals in the grooves 28 of one set of wheels 24. In operation, the spring members 80 yieldingly press against and gently raise those bullets which approach the opening 30 in an improper position so as to enable them to become agitated with the mass until they assume a vertical position. For example, if two bullets coming down opposed grooves 28 meet above the opening 30 so that further progress is impeded, the spring member 80 will effect separation thereof, lifting one upwardly and permitting the remaining bullet to fall through. Also, in the event that a pair of bullets should become hooked together by the grooved portions adjacent their firing ends, the gentle raising movement effected by the springs 80 will tend to yieldingly lift the pair upwardly to enable them to become disengaged in the mass, thus avoiding blocking of the opening 30 and clearing a path for subsequent properly positioned bullets to fall through.

From the description thus far it will be observed that the present feeding or releasing mechanism is operative to release elongated cylindrical objects such as bullets, either of the tapered or conical form or those bullets which are of substantially uniform cross section throughout their length.

After the bullets pass through the openings 30, provision is made for guiding them from their vertical position into a horizontal position and to transfer them onto horizontally disposed feed belts 82 and as herein shown, this is accomplished by a guide member 84. The guide member, as herein shown, comprises a curved plate supported substantially concentrically to the set of wheels 26 and down which the bullets slide end to end after passing through the openings 30. During their travel down the plate the bullets are supported laterally between the grooves or channels 28 of their respective wheels 26. The bullets thus being fed in their axially aligned position slide onto their individual belts 82 upon which they are carried fowardly end to end in single file but without discrimination as to which end of a bullet comprises the forward end.

As herein shown, the guide plate 84 is attached to a supporting bracket 86 provided with arms 88 mounted on studs 90, 92 extending from the side frames 36, 38 respectively. The bracket 86 is retained in operative position with respect to the wheels 26 by an arm 94 connected at one end to a lug 96 at the rear of the bracket 86 and connected at its other end to a stud 98 journaled in a bearing bracket 100 attached to the platen 40. With this construction it will be seen that no relative movement of the parts is permitted when assembled in operative position, as shown. However, provision is made for quickly and easily moving the guide plate out of its operative position in the event of a jam. As herein illustrated, the stud 98 is detachably retained in the bracket 100 by a curved spring member 102 which is mounted to yieldingly press into a groove 103 formed in the stud 98 so as to prevent withdrawal thereof. In operation, the set of wheels 24 is first moved back out of the way by turning the hand wheels 66 and then by manually pressing the spring 102 out of the groove 103, the stud 98 may be withdrawn. The arm 94 is thus released so that the supporting bracket 86 may be rocked backwardly on its pivots 90, 92 out of its operative position.

As clearly shown in Fig. 5, the upper portion of the guide plate 84 is shaped in the form of a plurality of fingers 104 having slots 106 formed therein for the passage of the bent wire spring members 80, the spaces 108 between the fingers 104 providing clearance for the eccentric disks 72, 73. The plate supporting bracket 86 is also provided with slots for passage of the eccentric disks as are the front wall 114 of the hopper and the bottom plate 14, as shown in Fig. 2.

The individual belts 82 upon which the bullets are carried forwardly in single file and arranged end to end, run over pulleys 116, 118 and across a guide plate 120 supported upon brackets 122 attached to the platen 40. The idler pulley 116 is carried on a shaft 124 supported between arms 126 of a bracket 128 depending from the underside of the guide plate 120, and may be provided with grooved portions 130, as shown, to permit passage of the eccentric disks 73 therethrough. The driven pulley 118 is mounted fast upon the drive shaft 54 and is formed integrally with the orienting device, indicated generally at 132. The orienting device comprises a plurality of spaced circular disks 134 between which the individual bullets are received and carried up to permit them to swing around so that each bullet will point downwardly, as will be hereinafter more fully described.

The bullets are guided on the belts 82 between rails 136 upstanding from the guide plate 120 which may and preferably will be provided with a transparent top or cover 138 whereby to enable the progress of the bullets to be observed and to enclose the guideways to prevent foreign matter from entering therein.

Provision is made for stopping each line of bullets and for releasing the foremost bullet in each line so as to permit all of the foremost bullets of the several lines to enter the orienting device simultaneously while the remainder of each line is held back, and as herein shown, a timing and releasing device, indicated generally at 139 is arranged to release successive transverse rows of bullets periodically so as to permit orderly arrangement thereof when they are discharged from the orienting device, as will be hereinafter described. The bullets are advanced along their respective belts until the foremost bullet in each line comes to rest against an individual stop finger 140 carried by and depending from a transverse bar 142 arranged to be moved into and out of alignment with the bullets in the guideways 144. As herein shown, the transverse bar 142 is slidingly mounted in side brackets 146, 148 attached to the forward end of the guide plate 84. A spring 150 is arranged to move the transverse bar in one direction to align the fingers 140 with their respective guideways 144, the bar being adjustably limited in its movement in this direction by a stop screw 152. The bar 142 is arranged to be intermittently moved in the opposite direction, to permit the bullets to pass, by connections including a cam 154 mounted on a cam shaft 156 and which is arranged to cooperate with a roller 158 carried by one arm 160 of a bell crank, as best shown in Fig. 6. The bell crank is pivotally mounted on a cross shaft 162 and the second arm 163 thereof is connected by a link 164 to a lever 166 carried at the lower end of a vertically mounted shaft 168. The upper end of the shaft 168 carries an arm 170 arranged to engage one end of the transverse bar 124 to effect movement of the bar to the left, viewing Fig. 10, to permit the bullets to pass through into the orienting device at the proper time.

In order to hold back the remainder of each line of bullets so that only the foremost thereof passes into the orienting device, a second transverse bar 172 is provided which is also slidingly mounted in the side brackets 146, 148. The transverse bar 172 is provided with a plurality of depending flat springs 174 arranged to extend into the guideways 144 and the bar 172 is arranged to be moved to the left, viewing Fig. 9, by a spring 176 to dispose the flat springs in sockets 177 cut in the upstanding rails 136, as illustrated, to permit the bullets to pass. A stop screw 178 is provided to limit the movement of the bar 172 to the left, and movement in the opposite direction, which is effected by a cam 180, will cause the flat springs 174 to be yieldingly pressed against the side of their adjacent bullets to hold the rows stationary. The cam 180 is mounted on the cam shaft 156 and is arranged to cooperate with a roller 182 carried by one arm 184 of a two armed lever, the second arm 186 of which is connected by a link 188 to an arm 190 on the lower end of a vertical shaft 192. The upper end of the shaft 192 carries an arm 194 arranged to engage one end of the bar 172 to effect movement thereof to the right viewing Fig. 9.

The cams 154, 189 are designed so that in the operation of the device, when the bar 142 is moved to release the foremost bullets in each line, the bar 172 is moved to hold back the remainder of each line, and after the foremost bullets have passed into the orienting device, the bar 142 is again moved to move the fingers 140 into alignment with the guideways 144 and the bar 172 is moved to release the lines of bullets and to permit a succeeding group of foremost bullets to be advanced on the continuously moving belts 82 to engage the fingers 140 in readiness for a succeeding cycle of operation of the machine.

When starting the machine, in order to assure that each guideway or reservoir 144 is supplied with a sufficient number of bullets to begin operation, provision is made for rendering the bar 172 ineffective to release any bullets until all the guideways have been provided with bullets from the releasing device. As herein shown, a manually operated latch 196, pivotally mounted at 198 in the side bracket 146, is arranged to be manually rocked to the right, viewing Fig. 9 to the position illustrated in dotted lines therein, in which position the latch 196 will engage a stop member 200 provided on the bar 172 in order to hold the bar back against the tension of the spring 176. Thus, the flat springs 174 are held in position to engage and hold the lines of bullets as they are delivered from the releasing device, and when a sufficient number of bullets have been supplied to start operation, as may be observed through the transparent cover 138, the latch 196 is rocked back out of the way to permit normal operation of the device, as above described.

From the description thus far it will be observed that a transverse row of bullets comprising the foremost bullets in each line thereof is periodically released into the orienting device 132 and that when the bullets arrive at the orienting device they may be pointed head first or tail first according to the position in which they were released from the feeding device 18, as above described. The orienting device 132 is designed to receive the conical shaped bullets between the spaced disks 134 as the bullets are advanced upon the belts 82, see Fig. 8. Those bullets which arrive in such position with the smaller end or head in advance are engaged by the spaced disks 134 at such a point that as they are thus carried up between the rotating disks, the unbalanced weight of the head or pellet end of the bullet causes it to rotate into a vertical position, as shown in Fig. 11. Those bullets arriving with the firing end or tail portion first are lifted up by the widened portion of the disks, as shown in dotted lines in Fig. 8, until the edges of the disks engage the conical sides of the bullet as above described, so that when the bullets arrive at the discharging side of the orienting device, they all point in the same direction, that is, head or pellet end down.

When the bullets arrive at the discharge side of the disks 134, they are arranged to be discharged into individual V-shaped groove members 202 of a chute 204 arranged to project into a position to pick off the bullets and to guide the bullets into selected rows of a pallet comprising a studded tray 206 supported upon an angularly disposed guide bracket 208. The pallets may be manually placed and moved upon the supporting bracket. In order to assist those bullets which are slow in turning into a vertical position as they are carried between the disks 134, and to assure that each bullet is rotated to a position such as to enable the chute 204 to remove it in the proper position, a brush 210 is provided which is arranged to brush against the upper ends of the bullets as they pass the brush, as illustrated. The brush is carried by a stationary angle member 212 secured to an extended portion 214 of the bracket 216 in which the shaft 54 is journalled. The brush is positioned at an angle, as shown, to engage the bullets just before they arrive at the point of discharge on the downwardly traveling side of the disks 134. In this manner, a substantially vertical position of the bullets is assured when they arrive at the point of discharge, and also any slight frictional resistance of the bullet against the sides of the disks 134 may be overcome to enable the bullets to turn freely into the position shown in Fig. 8.

As shown in Fig. 12, the pallet 206 comprises a base portion 218 and a plurality of short pales or studs 220 upstanding therefrom to form a plurality of equally spaced rows thereof. The spaces or sockets 222 formed between four adjacent studs 220 are proportioned to receive the bullets and to support them in a substantially vertical position, head down so that the peripheries of adjacent bullets supported thereby are substantially in contact with each other whereby to form a compact and uniform arrangement thereof suitable for packaging.

As herein shown, the chute 202 is cut out to provide a plurality of fingers 224 extending into the spaces 226 formed between adjacent disks 134, and the V-shaped grooves 202 are arranged to converge downwardly as illustrated to guide the bullets into adjacent spaces 222 of the pallet 206. It will be observed that the number of bullets released into the chute 202 per cycle of operation of the machine, herein shown as ten, preferably corresponds to the number of spaces 226 in one transverse row of the pallet. In order to successively fill adjacent rows of the pallet, provision is made for automatically moving the delivery end of the chute so that upon completing one cycle of operation to fill one row of the pallet, herein shown as the top row, the chute is moved to present the delivery end thereof into a position to fill an adjacent row during the next cycle of operation until, in the illustrated device, the five rows are filled, whereupon the delivery end of the chute is automatically raised to fill the top row of a succeeding pallet which is manually moved by the operator into proper position in the guideway 208. As illustrated in Fig. 8, the upper portion of the chute 202 is secured to a flattened portion 228 of a cross shaft 230 rockingly mounted in opposed arms 217 of the bracket 216 and the lower portion of the chute is connected by a link 232 to one arm 234 of a cam lever, see Fig. 6, pivotally mounted on a cross shaft 236. The second arm 238 of the cam lever carries a roller 240 which cooperates with a cam 242 mounted fast on a slowly rotating cam shaft 244. A spring 246 may be provided to hold the roller 240 against its cam. As shown in Figs. 1 and 6, the cam 242 is provided with five progressively increased cam surfaces, and, the cam is driven in timed relation to the release of the bullets into the chute 202 so that each time a row of bullets is delivered to the pallet, the chute is moved a distance corresponding to one row until the last row is filled whereupon a sharp drop in the cam surface operates to raise the chute into a position to fill the top row of a succeeding pallet. An upper guide plate 248 may be provided on the chute adjacent the point of minimum convergence where the V-shaped grooves change from an angular to a straight position, as shown, in order to prevent the relatively swiftly traveling bullets from being diverted out of the chute at this point.

As above stated, the machine may be driven through connections from a motor 56 and, as shown herein, the motor is connected by a belt 250 to a clutch pulley 252 mounted on a shaft 254 and which is arranged to be engaged and disengaged in driving relation to the shaft 254 by connections including a clutch handle 256 as clearly shown in Figs. 1 and 6. The shaft 254 is provided with a pinion 258 meshing with a gear 260 on an intermediate shaft 262 and the latter shaft is provided with a pinion 264 cooperating with a gear 266 fast on the cam shaft 156. The driving mechanism from the cam shaft 156 to the pulley and orienting disk 54 includes a pinion 268 on the shaft 156, a gear 270 on an intermediate shaft 272, and a sprocket 274 connected by a chain 276 to a sprocket 278 fast on the shaft 54. The slower moving cam shaft 244 is provided with a large gear 280 which meshes with the gear 270 on the shaft 272, the pinion 268 completing the train to drive the shaft 244 at a ratio of five to one for the purpose described.

In practice, when a pallet is filled, the operator may take a carton or other container in one hand and place it in an inverted position on top of the bullets in the pallet held in the other hand, and by simply inverting the members, the bullets may upon removal of the pallet be transferred into the container in the desired position. Although this operation has been described as being manually effected, it is appreciated that the pallets may be moved into position automatically.

To recapitulate, in the operation of the machine, the bullets in the supply hopper 10 are selectively released therefrom by the releasing mechanism 18 to present the bullets in longitudinal rows, end to end, in the guideways 144 without discrimination as to whether the bullets point forwardly or backwardly. The lines of bullets thus being advanced on the continuously moving belts 82 are brought to rest by the timing and releasing mechanism 139 which is adapted to release a transverse row comprising the foremost bullet in each line, into the orienting device 132. As the bullets are carried around between the disks 134 of the orienting device they are caused to rotate into a substantially vertical position with the heavier or pellet end of each bullet pointing downwardly. The bullets are then discharged from the orienting device in their orientated position onto a chute 202 which is arranged to guide the bullets into a pallet having provision for supporting a plurality of adjacent rows of bullets. During each cycle of operation one row of bullets is fed into the pallet and upon delivery of one such row the delivery end of the chute 202 is moved to present it into alignment with the next adjacent row in the pallet until the last row is filled. The operator then positions an empty pallet in operative position and the operations of the machine are repeated.

From the above description it will be observed that the present apparatus is particularly adapted for handling elongated tapered articles such as bullets in a simple and expeditious manner to cause them to assume a uniform and compact arrangement to facilitate the packing thereof.

While the preferred embodiment of the invention has been herein illustrated and described, it will be understood that the invention may be embodied in other forms within the scope of the following claims.

Having thus described the invention, what is claimed is:

1. In a bullet handling machine, the combination with means including an endless conveyor for feeding bullets in adjacent horizontally disposed longitudinal rows end to end without discrimination as to whether the pellet ends point forwardly or rearwardly, of orienting mechanism comprising spaced rotary disks between which said conveyor passes and by which the bullets are fed in a horizontal position to be engaged along their sides in a manner such as to permit swiveling of the bullets as they are carried between said rotating disks whereby to dispose the heavier or pellet end of each bullet downwardly, and a delivery chute disposed on the opposite side of said spaced disks and having a plurality of fingers extended between the disks disposed to cause the bullets to be discharged with their pellet ends foremost.

2. In a machine of the character described, in combination, a plurality of continuously moving horizontal belts for feeding bullets in adjacent longitudinal rows end to end without discrimination as to whether the pellet ends point forwardly or rearwardly, and an orienting device comprising spaced rotary disks between which said belts pass and by which the bullets being fed by the belts are engaged along their sides in a manner such as to permit swiveling of the bullets as they are carried between said rotating disks whereby to dispose the heavier or pellet end of each bullet downwardly, and a delivery chute disposed on the opposite side of said spaced disks and having a plurality of fingers extended between the disks disposed to cause the bullets to be dischargd with their pellet ends foremost.

3. In a machine of the character described, in combination, a continuously moving horizontal belt for feeding tapered bullets end to end in an elongated row without discrimination as to whether their larger or smaller diameter ends are directed forwardly or rearwardly, and an orienting device comprising spaced rotary disks between which said belt passes and by which the bullets being fed on the belts are engaged at a point spaced from a vertical line passing through the center of said disks, said disks having peripheral grooves on their inner faces forming a widened portion therebetween, those bullets being fed with their smaller diameter ends foremost passing between said disks to be engaged along their tapering sides by adjacent edges of the disks to permit swiveling of the bullets as they are carried therebetween to dispose the smaller diameter ends downwardly, and those bullets being fed with their larger diameter ends foremost being engaged by said widened portion and in cooperation with the advancing movement of the belt effecting lifting of the larger diameter ends until the tapered sides of the bullets are engaged by the adjacent edges of the disks to permit similar swiveling movement, and a delivery chute disposed on the opposite side of said spaced disks and having a plurality of fingers extended between the disks disposed to cause the bullets to be discharged with their smaller ends foremost.

4. In a bullet handling machine, the combination with means including an endless horizontally disposed conveyer for feeding bullets in adjacent longitudinal rows end to end without discrimination as to whether the pellet ends point forwardly or rearwardly, of orienting mechanism comprising spaced rotary disks between which said conveyer passes and by which the bullets are fed to be engaged along their sides in a manner such as to permit swiveling of the bullets as they are carried between said rotating disks whereby to dispose the heavier or pellet end of each bullet downwardly, and a delivery chute into which the bullets are discharged in their oriented position said chute having a plurality of V-shaped fingers formed integrally therewith extended between the disks and disposed at an angle such as to cause the bullets to be discharged with their pellet ends foremost.

5. In a machine of the character described, in combination, a plurality of continuously moving horizontal belts for feeding tapered bullets in adjacent longitudinal rows end to end without discrimination as to whether the pellet ends point forwardly or rearwardly, a pulley over which said belts run, and an orienting device comprising spaced rotary disks formed integrally with said pulley and between which the bullets are fed to be engaged along their tapered sides in a manner such as to permit swiveling of the bullets as they are carried between said rotating disks whereby to dispose the heavier or pellet end of each bullet downwardly, and a delivery chute disposed on the opposite side of said spaced disks and having a plurality of fingers extended between the disks disposed to cause the bullets to be discharged with their pellet ends foremost.

6. In a machine of the character described, in combination, a plurality of continuously moving horizontal belts for feeding bullets in adjacet longitudinal rows end to end without discrimination as to whether the pellet ends point forwardly or rearwardly, and an orienting device comprising spaced rotary disks between which said belts pass and by which the bullets being fed by the belts are engaged along their sides in a manner such as to permit swiveling of the bullets as they are carried between said rotating disks whereby to dispose the heavier or pellet end of each bullet downwardly, and intermittently operating means associated with said continuously moving belts for simultaneously releasing the foremost bullet in each row into said orienting device a delivery chute disposed on the opposite side of said spaced disks and having a plurality of fingers extended between the disks disposed to cause the bullets to be discharged with their pellet ends foremost.

ROBERT WILLIAM VERGOBBI.